US012738124B2

(12) United States Patent
Milosevich et al.

(10) Patent No.: US 12,738,124 B2
(45) Date of Patent: Sep. 15, 2026

(54) GAMING SYSTEM AND METHOD WITH A VALUE-BEARING SYMBOL FEATURE

(71) Applicant: LNW Gaming, Inc., Las Vegas, NV (US)

(72) Inventors: Richard Milosevich, Las Vegas, NV (US); Kenneth Shawn Soong, Henderson, NV (US); George Bouvier, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 288 days.

(21) Appl. No.: 17/846,099

(22) Filed: Jun. 22, 2022

(65) Prior Publication Data

US 2023/0419771 A1 Dec. 28, 2023

(51) Int. Cl.
*G07F 17/32* (2006.01)

(52) U.S. Cl.
CPC ...... *G07F 17/3213* (2013.01); *G07F 17/3258* (2013.01); *G07F 17/3267* (2013.01)

(58) Field of Classification Search
CPC ............. G07F 17/3213; G07F 17/3258; G07F 17/3267
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
5,356,140 A 10/1994 Dabrowski et al.
5,393,061 A 2/1995 Manship et al.
5,395,111 A 3/1995 Inoue
(Continued)

FOREIGN PATENT DOCUMENTS

AU 2001055957 A1 3/2002
AU 2013251288 A1 5/2014
(Continued)

OTHER PUBLICATIONS

Ancient Arcadia game brochure, Copyright 2011 IGT.
(Continued)

*Primary Examiner* — Jeffrey K Wong

(57) ABSTRACT

There is provided a gaming system and methods that utilize a presentation assembly configured to present a series of spins of a plurality of symbol-bearing reels including value-bearing symbols. Upon a triggering event, all value-bearing symbols contributing to the triggering event and any value-bearing symbols adjacent to them are added to a list of linked symbols. All value-bearing symbols are held in their positions in the array and the plurality of reels is spun again to land new symbols in unheld positions of the array. Any newly landed value-bearing symbols adjacent to a symbol in the set of linked symbols is added to the set of linked symbols and the process repeats for a certain number of spins. At the conclusion of the spins, an award based on the values borne by all symbols in the set of linked symbols is paid.

20 Claims, 7 Drawing Sheets

(56) References Cited

U.S. PATENT DOCUMENTS

| | | | |
|---|---|---|---|
| 5,431,408 | A | 7/1995 | Adams |
| 5,511,781 | A | 4/1996 | Wood et al. |
| 5,618,232 | A | 4/1997 | Martin |
| 5,695,188 | A | 12/1997 | Ishibashi |
| 5,704,835 | A | 1/1998 | Dietz |
| 5,722,891 | A | 3/1998 | Inoue |
| 5,752,881 | A | 5/1998 | Inoue |
| 5,766,074 | A | 6/1998 | Cannon et al. |
| 5,788,573 | A | 8/1998 | Baerlocher et al. |
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,869,360 | B2 | 3/2005 | Marks et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,926,609 | B2 | 8/2005 | Martin |
| 6,960,134 | B2 | 11/2005 | Hartl et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,121,945 | B2 | 10/2006 | Suganuma et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,980,936 | B2 | 7/2011 | Mead |
| 8,021,223 | B2 | 9/2011 | Rose |
| 8,021,225 | B2 | 9/2011 | Okada |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,121 | B2 | 8/2013 | Macvittie et al. |
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,771,054 | B2 | 7/2014 | Aoki et al. |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |

(56) References Cited

U.S. PATENT DOCUMENTS 8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,704,342 B2 7/2017 Aoki et al.
9,928,691 B2 3/2018 Olive
10,013,855 B2 7/2018 Nakamura
10,037,651 B2 7/2018 You et al.
10,043,350 B2 8/2018 Gomez et al.
10,062,237 B2 8/2018 Devine et al.
10,204,473 B2 2/2019 Lenger
10,242,533 B2 3/2019 Okada et al.
10,339,761 B2 7/2019 Olive
10,366,575 B2 7/2019 Msser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,672,220 B2 6/2020 Lenger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0021666 A1 9/2001 Yoshida et al.
2001/0031659 A1* 10/2001 Perrie ................ A63F 3/00643 463/18
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0043815 A1 3/2004 Kaminkow
2004/0048646 A1 3/2004 Msocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0014559 A1* 1/2005 Mattice ............... G07F 17/3241 463/29
2005/0035550 A1* 2/2005 Jackson ............. G07F 17/3297 273/292
2005/0054442 A1 3/2005 Anderson et al.
2005/0130731 A1 6/2005 Englman et al.
2005/0159208 A1 7/2005 Pacey
2005/0239538 A1* 10/2005 Dixon ..................... G07F 17/34 463/20
2006/0009286 A1 1/2006 Durham et al.
2006/0063588 A1 3/2006 Poole
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0026831 A1* 1/2008 Wright ................ G07F 17/3281 463/26
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0182647 A1 7/2008 Brunet De Courssou et al.
2008/0227538 A1* 9/2008 Kelly .................. G07F 17/3262 463/25
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0239634 A1 9/2009 Nguyen
2009/0270163 A1* 10/2009 Mitelman ............... G07F 17/32 463/20
2009/0291741 A1 11/2009 Schofield
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0244943 A1 10/2011 Milford et al.
2011/0300937 A1 12/2011 Crowder, Jr. et al.
2012/0015707 A1 1/2012 Hornik et al.
2012/0034965 A1 2/2012 Masen et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0220360 A1 8/2012 Kelly et al.
2013/0053124 A1 2/2013 Masen et al.
2013/0065663 A1 3/2013 Johnson et al.
2013/0102375 A1 4/2013 Aoki et al.
2013/0252704 A1 9/2013 Gilbertson et al.
2013/0260861 A1 10/2013 Vann et al.
2013/0273997 A1* 10/2013 Stewart ............... G07F 17/3244 463/20
2013/0324217 A1 12/2013 Gilbertson et al.
2014/0014186 A1 1/2014 Bhattacharya et al.
2014/0024429 A1 1/2014 Aoki et al.
2014/0051496 A1 2/2014 Meyer
2014/0141860 A1 5/2014 Meyer
2014/0179396 A1 6/2014 Aoki et al.
2014/0274292 A1 9/2014 Suda

(56) References Cited

U.S. PATENT DOCUMENTS

| | | | | |
|---|---|---|---|---|
| 2014/0323198 | A1 | 10/2014 | Tuck | |
| 2015/0031437 | A1 | 1/2015 | Gomez et al. | |
| 2015/0072770 | A1* | 3/2015 | Simongini | G07F 17/3244 463/25 |
| 2015/0170462 | A1 | 6/2015 | Berman et al. | |
| 2015/0206386 | A1 | 7/2015 | Jaffe et al. | |
| 2015/0269809 | A1 | 9/2015 | Smith | |
| 2015/0287269 | A1 | 10/2015 | Berman | |
| 2015/0356833 | A1 | 12/2015 | Aoki et al. | |
| 2015/0379831 | A1 | 12/2015 | Lee et al. | |
| 2016/0042597 | A1 | 2/2016 | Olive | |
| 2016/0155303 | A1 | 6/2016 | Aoki et al. | |
| 2017/0154498 | A1 | 6/2017 | Olive | |
| 2017/0372558 | A1 | 12/2017 | You et al. | |
| 2018/0025585 | A1* | 1/2018 | Schmidt | G07F 17/3211 463/20 |
| 2018/0102020 | A1* | 4/2018 | You | G07F 17/3267 |
| 2018/0130303 | A1 | 5/2018 | Amb | |
| 2018/0268655 | A1 | 9/2018 | Olive | |
| 2018/0268659 | A1 | 9/2018 | Chesworth et al. | |
| 2019/0102992 | A1 | 4/2019 | You et al. | |
| 2019/0236905 | A1 | 8/2019 | Washington et al. | |
| 2023/0089842 | A1* | 3/2023 | Daley | G07F 17/3211 463/18 |
| 2023/0306817 | A1* | 9/2023 | Strom | G07F 17/3255 |

FOREIGN PATENT DOCUMENTS

| | | | |
|---|---|---|---|
| AU | 2014202042 | A1 | 5/2014 |
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Product Sheet for “Vikings Creed,” Released Oct. 2020, Slotmill Limited.
“Jack and the Beanstalk” Game Sheet, Copyright 2017 NetEnt Product Services Ltd.

* cited by examiner

GAMING SYSTEM AND METHOD WITH A VALUE-BEARING SYMBOL FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations in connection with a feature in which a plurality of value-bearing symbols in an array of symbol-bearing reels create unique winning combinations of the symbols.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system and methods that utilize a presentation assembly configured to present a series of spins of a plurality of symbol-bearing reels including value-bearing symbols. Upon a triggering event, all value-bearing symbols contributing to the triggering event and any value-bearing symbols adjacent to them are added to a list of linked symbols. All value-bearing symbols are held in their positions in the array and the plurality of reels is spun again to land new symbols in unheld positions of the array. Any newly landed value-bearing symbols adjacent to a symbol in the set of linked symbols is added to the set of linked symbols and the process repeats for a certain number of spins. At the conclusion of the spins, an award based on the values borne by all symbols in the set of linked symbols is paid. Additional aspects of the invention will be apparent to those of ordinary skill in the art in view of the detailed description of various embodiments, which is made with reference to the drawings, a brief description of which is provided below.

Figure 1:
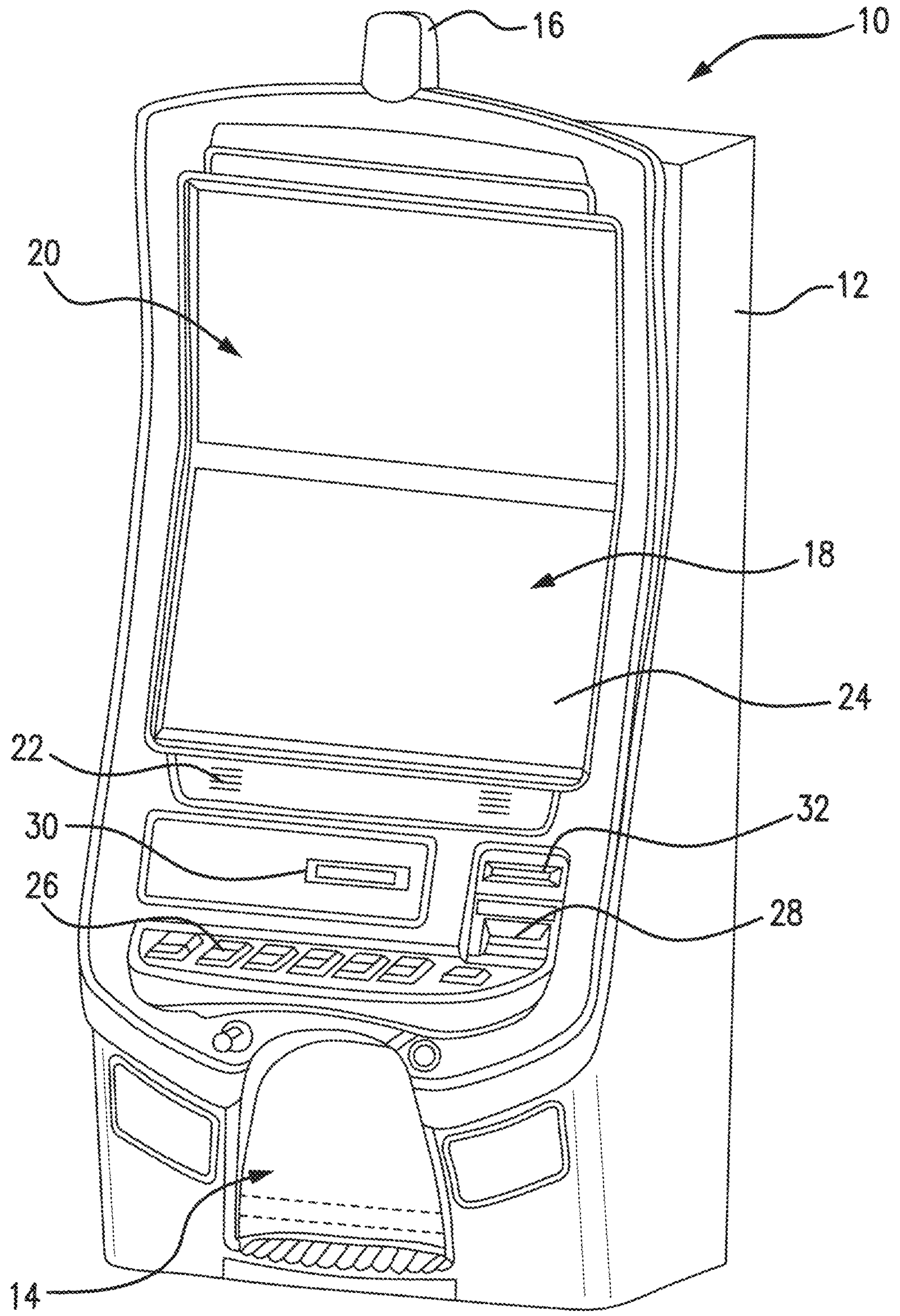
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 230 (see FIGS. 4-10). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 230 (see FIGS. 4-10), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
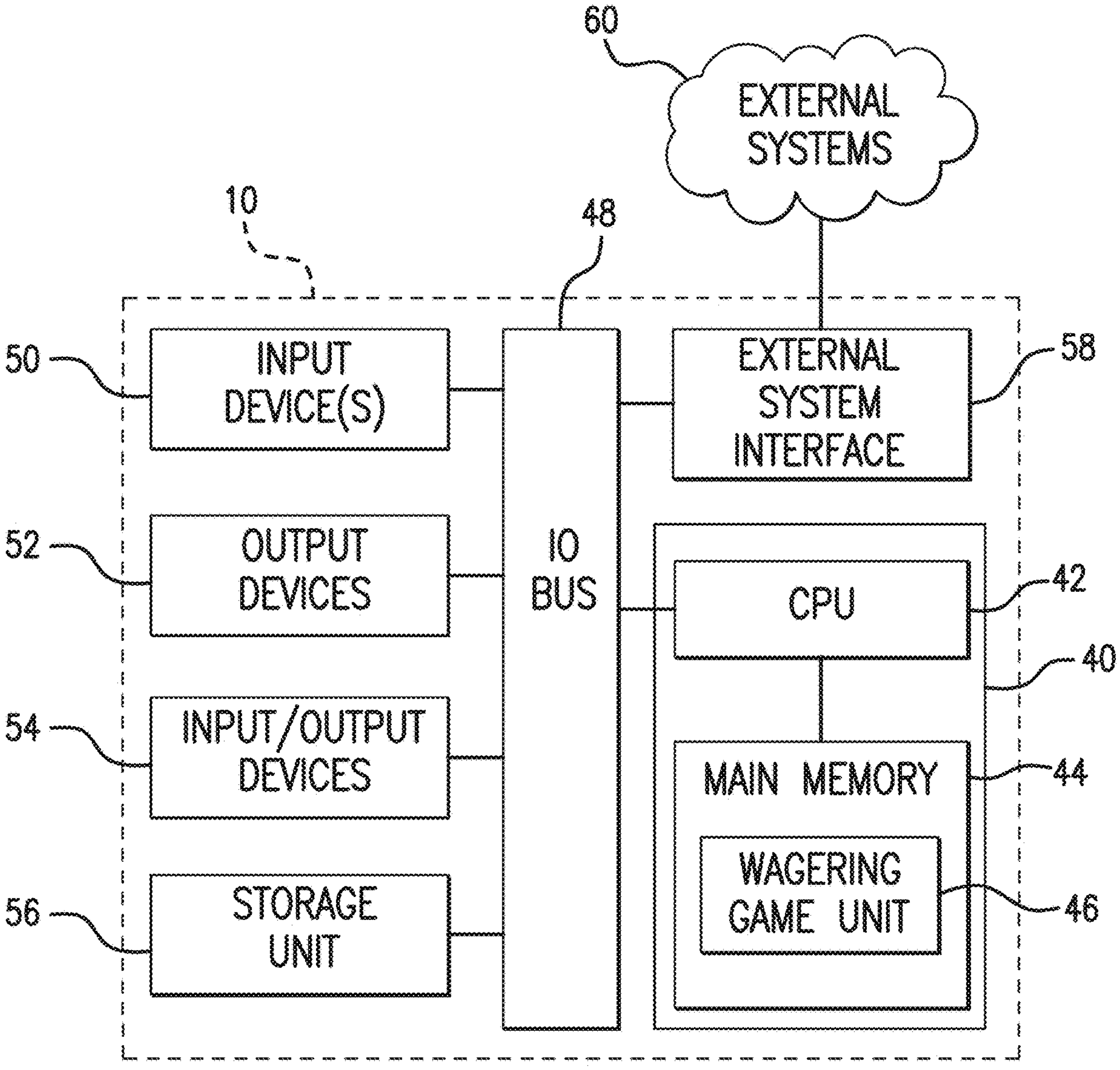
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
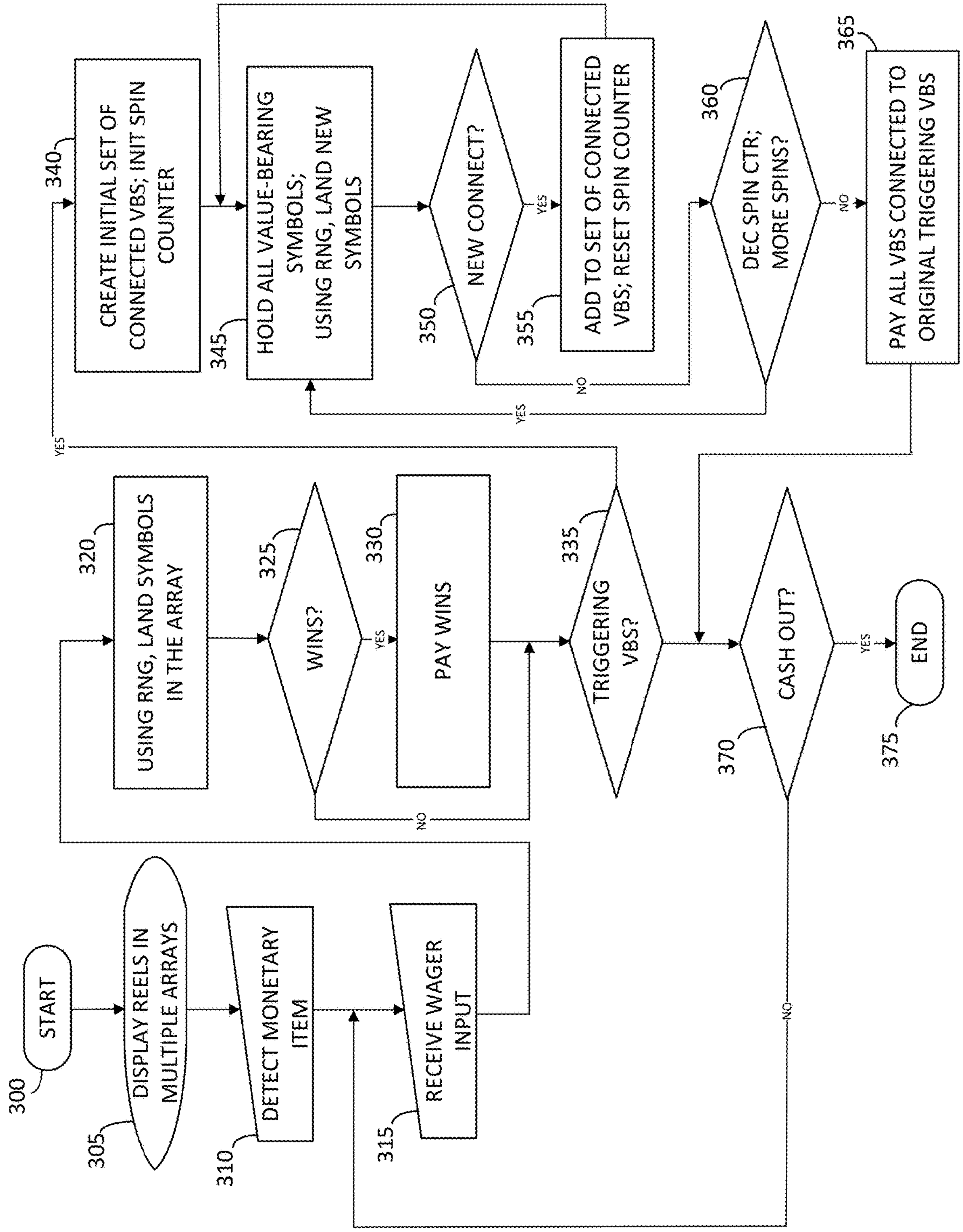
FIG. 3 is a flow diagram for a data processing method that corresponds to instructions executed by a controller, according to an embodiment of the present invention.

Referring now to FIG. 3, there is shown a flow diagram representing one data processing method corresponding to at least some instructions stored and executed by the game-logic circuitry 40 in FIG. 2 to perform operations according to an embodiment of the present invention. The data processing method is described below in connection with an exemplary representation of a set of game presentations in FIGS. 4-7.

The data processing method commences at step 300. At step 305, the game-logic circuitry controls one or more presentation devices (e.g., mechanical-reel display device, video display device, or a combination thereof) that presents a plurality of arrays of symbol positions. Although the method is described with respect to one presentation device, it is to be understood that the presentation described herein may be performed by a presentation assembly including more than one presentation device. The symbol positions of the arrays may be arranged in a variety of configurations, formats, or structures and may comprise a plurality of rows and columns. Each column may have a different number of symbols such that the rows are not generally horizontal. For example, as shown in FIGS. 4-7, the first column 216 is three symbols high, the second column 217 is four symbols high, the third column 218 is five symbols high, the fourth column 219 is six symbols high and the fifth column 220 is seven symbols high. In other embodiments, the rows of the arrays are oriented in a generally horizontal direction, and the columns of the arrays are oriented in a generally vertical direction. The symbol positions in each row of the arrays may be horizontally aligned with each other, and the symbol positions in each column of the arrays may be vertically aligned with each other; however, the number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In some embodiments, the reels are associated with respective individual symbol positions of the array such that each reel animates in place and populates only its respective symbol position.

At step 310, the game-logic circuitry detects, via a value input device, a physical item associated with a monetary value that establishes a credit balance. As shown in FIGS. 4-7, the credit balance may be shown on a credit meter 230 of the gaming machine.

At step 315, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 4-7, the wager may be shown on a bet meter 240.

FIGS. 4-7 illustrate examples of various spin cycles of a game in accordance with one or more embodiments. The game includes a base game displayed on a symbol array 200. At step 320, the game-logic circuitry spins and stops the reels to randomly land symbols in the columns 216-220 of the array 200. The reel spin may be animated on a video display by depicting symbol-bearing strips flashing the various symbols in each of their respective locations. In alternate embodiments, the reel spins may be a "virtual reel spin" performed by the game logic circuitry. When each reel stops, its respective determined symbol may be animated to fall from the top of the display into its assigned location in the array, animated to move horizontally across the display into its assigned location, etc. Any animation of the population of the array with randomly determined symbols falls within the scope of the various embodiments described herein.

Figure 4:
FIGS. 4-7 illustrate examples of game presentations corresponding to various steps presented in FIG. 3.

In FIG. 4, the array 200 is shown fully populated with its landed symbols. Any symbols forming winning combinations are detected at step 225. In the embodiments described here, winning combinations are evaluated as "line pays", in which like symbols must align along one or more pay lines running from left to right across the reels. In the example shown in FIG. 4, there are no winning combinations. In contrast, FIG. 5, at the conclusion of a different hypothetical spin cycle, illustrates a line pay of 5 "A" symbols extending along a pay line from the first column 216 to the fifth column 220. To animate a winning pay, the display may apply a border, pattern, color change, background change, watermark, or other distinguishing characteristic to the winning symbols that contributed to the pay.

At step 330, this combination (5 "A" symbols) and all other winning combinations in the array 200 results in payment of an award based on a pay table. The award may also be based on the size of the wager on bet meter 240. The sum of all winning awards is reflected on win meter 250.

Figure 5:
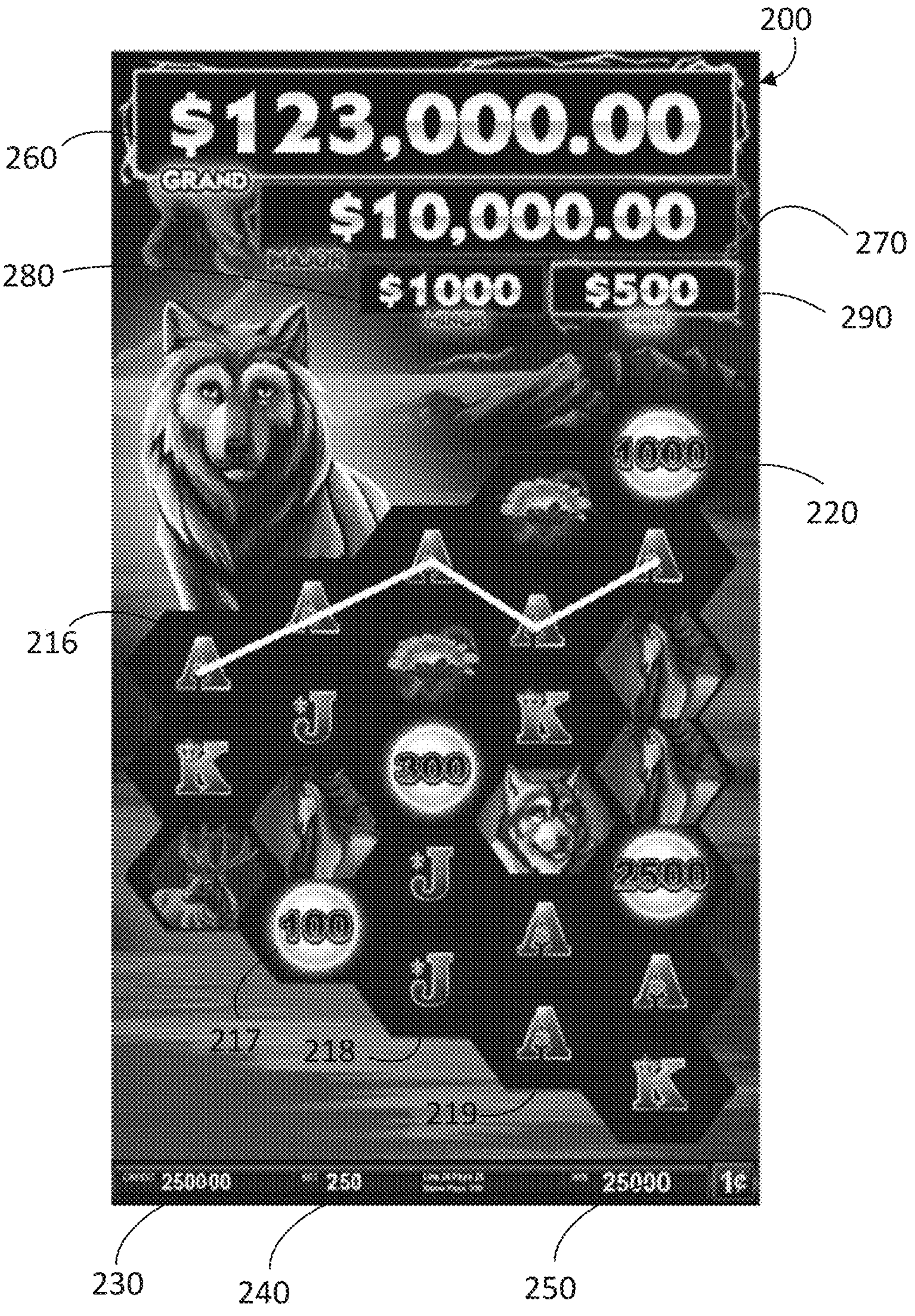

The examples shown in FIGS. 4 and 5 also include value-bearing symbols in columns 217, 218 and 220. In the examples shown in FIGS. 4 and 5, these value-bearing (VBS or WYSIWYG or "what you see is what you get") symbols are not part of winning combinations; however, winning combinations including value-bearing symbols will be explained below.

At step 335, the game logic circuitry checks for a triggering combination of symbols in the columns. If no triggering combination is detected, at step 370, the game logic circuitry checks to see whether the player indicates that no further play is desired via a cash out input. If no cash out is desired, a new spin is initiated with the acceptance of a new wager at step 315. If a cash out input is received at step 370, the method ends at step 375.

Figure 6:
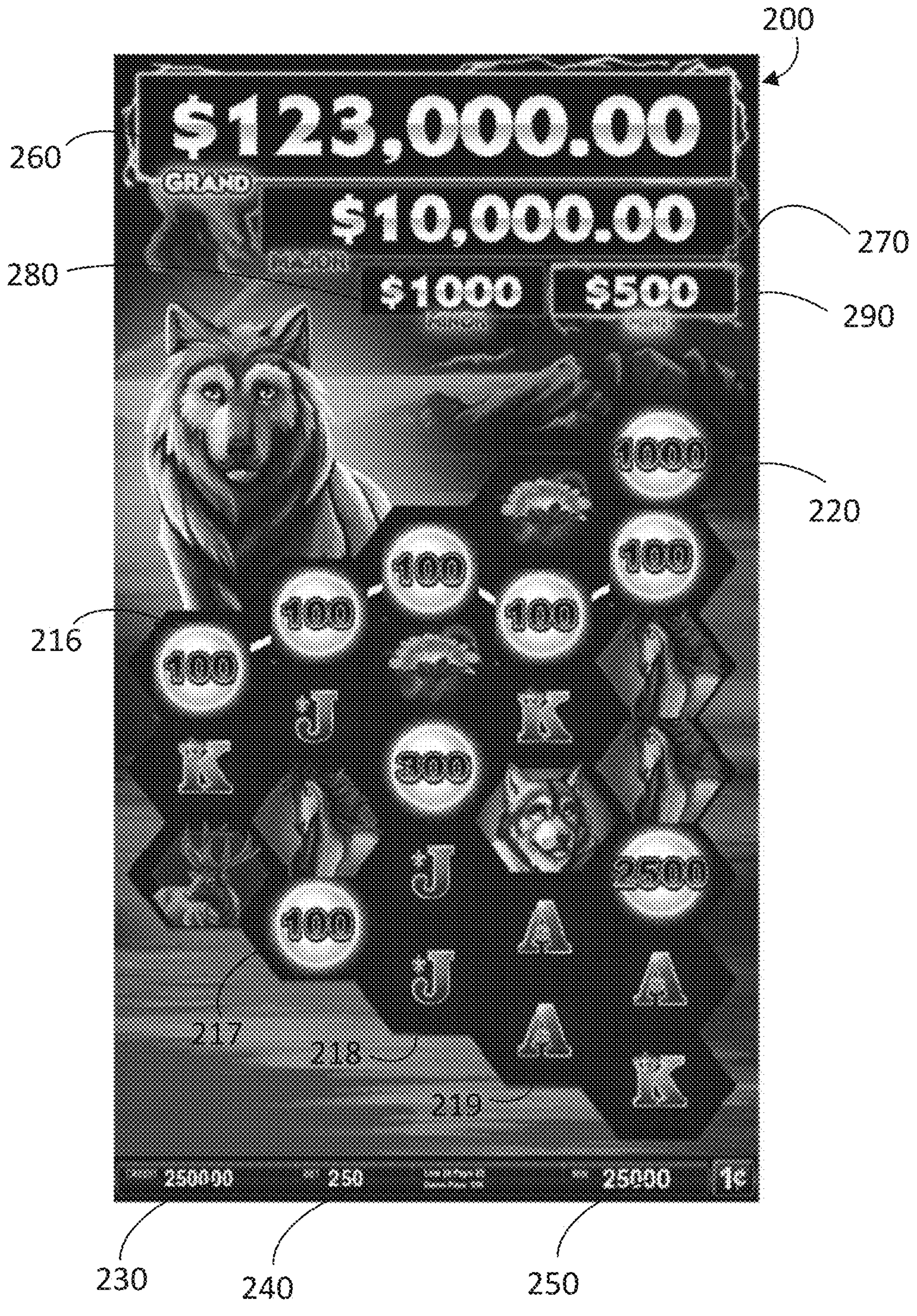

Turning to FIG. 6, in an example of a different hypothetical spin cycle, a triggering combination of symbols landed in the array, illustrating the alternate outcome at step 335. In the examples shown, the appearance of five value-bearing symbols (VSBs) along a pay line extending from the first column 216 to the fifth column 220 acts as a trigger that initiates a bonus game. At step 340, a certain number of free spins, for example, three free spins, are awarded and a spin counter is set to that value. It should be noted that some value-bearing symbols in the array are also considered to be "connected" or "linked" to the triggering combination of value-bearing symbols. In the example of FIG. 6, the 1000 symbol in column 220 is connected to the triggering combination of symbols, the significance of which will be explained below. An initial set of these connected or linked value-bearing symbols is determined at step 340, the set including the value-bearing symbols forming the triggering event and any other value-bearing symbols that are linked via adjacency to any of the value-bearing symbols forming the triggering event.

At step 345, all value bearing symbols appearing in the array are held in place. Using the RNG, the reels spin again to land new symbols in any locations in the array not "held." This action may be animated on the display as the reels spinning beneath the held value-bearing symbols.

Figure 7:
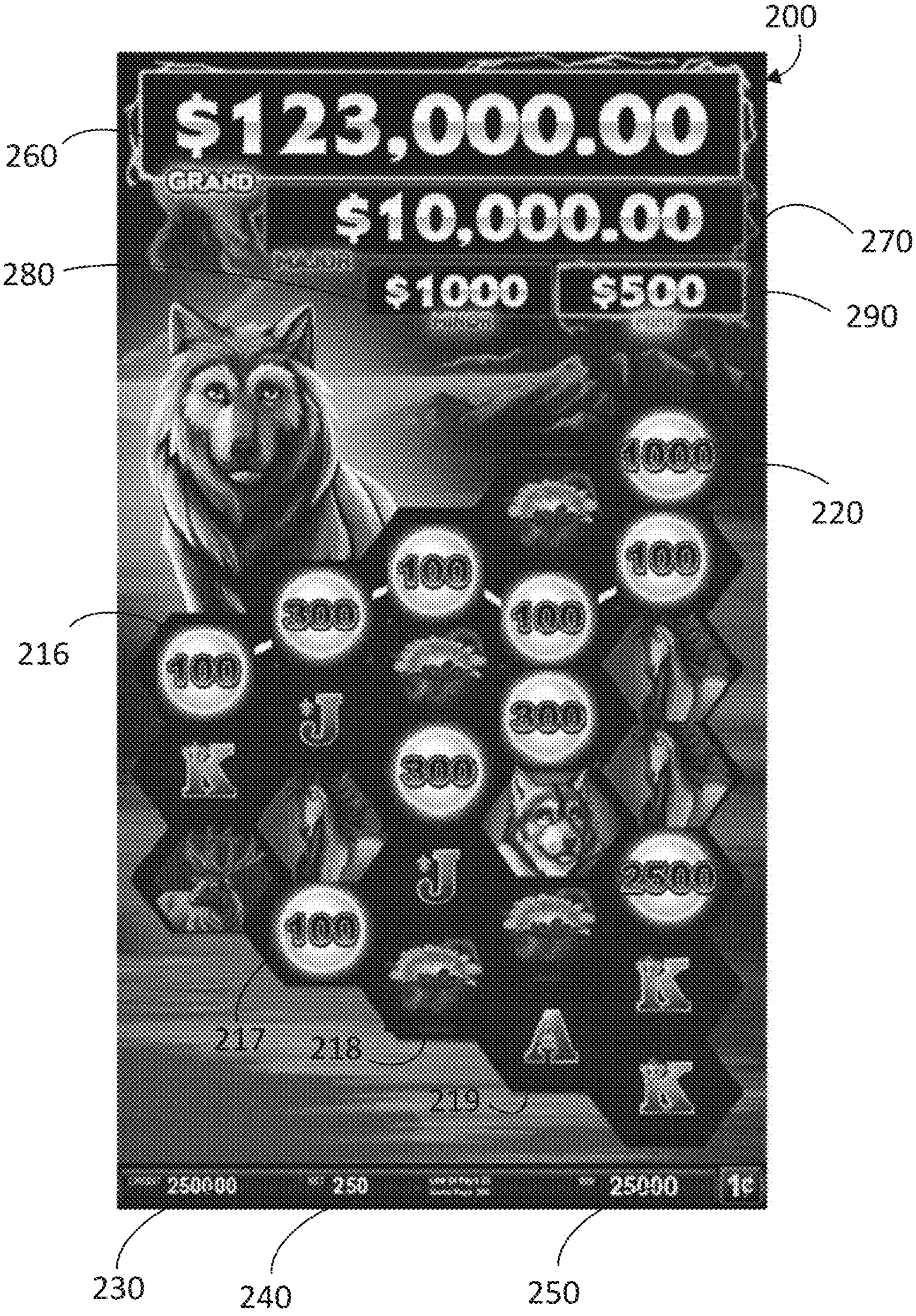

At step 350, the game logic circuitry checks to see whether the newly landed symbols in the array 200 include any additional value-bearing symbols that are connected, that is, landed adjacent to any of the triggering combination of value-bearing symbols. In the examples shown in FIGS. 4-7, because symbols in adjacent columns are offset by one-half symbol due to their hexagonal shape and the varying number of symbols in each column, the term adjacency as used herein extends beyond vertically, horizontally, or diagonally adjacent symbols and may include any symbol position that borders on or touches another symbol position. FIG. 7 illustrates a hypothetical free spin in which the 300 symbol in column 219 is newly connected to the triggering combination of symbols shown in FIG. 6. Additionally, the landing of the 300 symbol in column 219 has now linked the 300 symbol in column 218, previously unconnected, to the triggering combination of symbols by virtue of its adjacency to the newly landed 300 symbol in column 219. Thus, at the end of each additional spin, any newly landed value-bearing symbols adjacent to the position of any of the symbols already in the set of linked symbols may be added to the set at step 350. In the example of FIG. 7, the 100 symbol on reel 217 and the 2500 symbol on reel 220 remain unconnected to the original triggering combination of symbols and are not included in the set.

Because at least one new connection to the triggering combination of symbols was detected at step 350, the free spin counter is reinitialized at step 355 and the game logic circuitry returns to step 345 for another free spin of any unheld symbols.

Each time no new connection to the original triggering combination of symbols is detected, the free spin counter is decremented at step 360. If additional free spins remain, the game logic circuitry returns to step 345 for another free spin to replace any unheld symbols. However, if no remaining free spins remain at step 360, the free spins conclude and the symbols in the array are evaluated to determine a bonus game award at step 365. Assuming no additional connections were made after the free spin shown in FIG. 7, the bonus game award would be calculated based on the values borne by (i) each of the value-bearing symbols in the original triggering combination, i.e., 100+300+100+100+100=700, and (ii) each of the value-bearing symbols connected, directly or via another value-bearing symbol, to the original triggering combination of value bearing symbols, i.e., 300+300+1000=1600. Thus, the bonus game award would be calculated based on 700+1600=3300. This award may be modified based on the size of the wager shown on the bet meter 240, or the values on the value-bearing symbols that contribute to the award may already account for the size of the wager. The bonus game is then complete.

As above, at step 370, the game logic circuitry checks to see whether the player indicates that no further play is desired via a cash out input. If no cash out is desired, a new spin is initiated with the acceptance of a new wager at step 315. If a cash out input is received at step 370, the method ends at step 375.

The order of actions as shown in FIG. 3 is only illustrative and should not be considered limiting. For example, order of the actions may be changed, additional steps may be added or some steps may be removed without deviating from the scope and spirit of the invention. In a further example, while the above algorithm is described within the context of a bonus or feature game, it is equally contemplated that the invention can be practiced within the context of the basic wagering game.

In alternate embodiments, one or more of the value-bearing symbols may contain a multiplier symbol. For example, value-bearing symbols may contain one or more multipliers such as 2×, 3×, etc., that affect the final determination of the bonus game award. In some embodiments, even though a bonus game may not be triggered, two or more adjacent value-bearing symbols starting in the first column 216 may trigger the payment of any value-bearing symbols shown on the pay line or, alternately, all value-bearing symbols currently in the array. In other embodiments, the value-bearing symbols may indirectly indicate a value, for example, by indicating one or more jackpots by name, for example, the Grand 260, Major 270, Minor 280 or Mini 290 jackpots illustrated on FIGS. 4-7.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including a gaming cabinet and game-logic circuitry secured within a locked box inside the gaming cabinet, the game-logic circuitry including memory storing programming for a random number generator (RNG) and a wagering game, the method comprising the operations of:

prior to executing the wagering game, executing an authentication program on the gaming machine to authenticate the programming;

presenting, by a presentation assembly under control of the game-logic-circuitry, an array comprising a plurality of reels bearing a plurality of symbols, the plurality of symbols comprising standard symbols and value-bearing symbols; and conducting, by the game-logic circuitry, a spin of the plurality of reels, the spin including animating, on the presentation assembly, spinning and stopping the plurality of reels to land symbols from the plurality of symbols in the array in accordance with a first outcome randomly determined using the RNG;

presenting, on the presentation assembly, an award for any winning combinations of standard symbols according to a pay table;

in response to a triggering event based on a predetermined number of adjacent value-bearing symbols appearing on a pay line, initiating a bonus game comprising:

initializing a spin counter, via the game-logic circuitry, to a predetermined value;

holding all value-bearing symbols in their positions in the array;

determining, by the game-logic circuitry, a set of linked symbols comprising any value-bearing symbols forming the triggering eve it and any other value-bearing symbols that are linked via adjacency to any value-bearing symbols forming the triggering event, and displaying graphical connectors between symbols in the set of linked symbols on the presentation assembly, the graphical connectors visually identifying which value-bearing symbols in the set of linked symbols have their borne values included in a determination of a bonus game award;

animating, on the presentation assembly, spinning and stopping the plurality of reels to newly land symbols from the plurality of symbols in all unheld positions of the array in accordance with a second outcome randomly determined using the RNG;

decrementing the spin counter via the game-logic circuitry;

adding, by the game-logic circuitry, to the set of linked symbols, any newly landed value-bearing symbols adjacent to the position of any of the symbols in the set of linked symbols, updating the displayed graphical connectors on the presentation assembly to include the newly added symbols, thereby visually updating which value-bearing symbols have their borne values included in the determination of the bonus game award, reinitializing the spin counter, via the game-logic circuitry, to the predetermined value;

repeating the spinning and stopping, decrementing and adding steps until no spins remain on the spin counter; and presenting, on the presentation assembly, the bonus game award based on a sum of the values borne by all value-bearing symbols in the set of linked symbols as visually identified by the graphical connectors, the value-bearing symbols comprising the value-bearing symbols forming the triggering event and any value-bearing symbols connected, directly or via adjacency to another value-bearing symbol in the set of linked symbols, to the triggering event, wherein the bonus game award is determined by the game-logic circuitry without reference to a pay table.

2. The method of claim 1, further comprising the step of presenting, on the presentation assembly, an award based on the values borne by the adjacent value-bearing symbols on the pay line when the number of adjacent value-bearing symbols on the pay line are fewer than the predetermined number of adjacent value-bearing symbols required to form the triggering event.

3. The method of claim 1, further comprising the step of presenting, on the presentation assembly, an award based on the values borne by all value-bearing symbols in the array when the number of adjacent value-bearing symbols on the pay line are fewer than the predetermined number of adjacent value-bearing symbols required to form the triggering event.

4. The method of claim 1, wherein at least one value borne by the value-bearing symbols comprises a multiplier.

5. The method of claim 1, wherein at least one value borne by the value-bearing symbols indirectly indicates a jackpot value.

6. The method of claim 1, wherein at least two columns of the array comprise a different number of symbols.

7. The method of claim 6, wherein the array comprises five columns and the first column comprises three symbols, the second column comprises four symbols, the third column comprises five symbols, the fourth column comprises six symbols and the fifth column comprises seven symbols.

8. The method of claim 1, further comprising:

detecting, via a value input device, a physical item associated with a monetary value that establishes a credit balance; and receiving, via at least one of one or more electronic input devices, a cash out input that initiates a payout from the credit balance.

9. The method of claim 1, further comprising:

receiving, via at least one of one or more electronic input devices, a wager input that initiates the spin.

10. The method of claim 9, wherein the award based on the values borne by all symbols in the set of linked symbols is modified based on an amount of the wager input.

11. A gaming system comprising:

a gaming machine including a gaming cabinet and game-logic circuitry secured within a locked box inside the gaming cabinet, the game-logic circuitry including memory storing programming for a random number generator (RNG) and a wagering game, the gaming machine further including a presentation assembly configured to present a plurality of reels and an array, the plurality of reels bearing a plurality of symbols, the plurality of symbols comprising standard symbols and value-bearing symbols;

wherein the game-logic circuitry is configured to perform the operations of:

animating, on the presentation assembly, spinning and stopping the plurality of reels to land symbols from the plurality of symbols in the array in accordance with a first outcome randomly determined using the RNG;

presenting, on the presentation assembly, any winning combinations of standard symbols according to a pay table;

in response to a triggering event based on a predetermined number of adjacent value-bearing symbols appearing on a pay line, initiating a bonus game comprising:

initializing a spin counter to a predetermined value;

holding all value-bearing g symbols in their positions in the array;

determining a set of linked symbols comprising any value-bearing symbols forming the triggering event and any other value-bearing symbol that is linked via adjacency to any value-bearing symbols forming the triggering event and displaying graphical connectors between symbols in the set of linked symbols on the presentation assembly, the graphical connectors visually identifying which value-bearing symbols in the set of linked symbols have their borne values included in a determination of a bonus game award;

animating, on the presentation assembly, spinning and stopping the plurality of reels to newly land symbols from the plurality of symbols in all unheld positions of the array in accordance with a second outcome randomly determined using the RNG;

decrementing the spin counter via the game-logic circuitry;

adding, to the set of linked symbols, any newly landed value-bearing symbols adjacent to the position of any of the symbols in the set of linked symbols, updating the displayed graphical connectors on the presentation assembly to include the newly added symbols, thereby visually updating which value-bearing symbols have their borne values included in the determination of the bonus game award, and reinitializing the spin counter, via the game-logic circuitry, to the predetermined value;

repeating the spinning and stopping, decrementing and adding operations until no spins remain on the spin counter; and presenting, on the presentation assembly, the bonus game award based on a sum of the values borne by all value-bearing symbols in the set of linked symbols as visually identified by the graphical connectors, the value-bearing symbols comprising the value-bearing symbols forming the triggering event and any value-bearing symbols connected, directly or via adjacency to another value-bearing symbol in the set of linked symbols, to the triggering event, wherein the bonus game award is determined by the game-logic circuitry without reference to a pay table.

12. The gaming system of claim 11, further comprising the operation of presenting, on the presentation assembly, an award based on the values borne by the adjacent value-bearing symbols on the pay line when the number of adjacent value-bearing symbols on the pay line are fewer than the predetermined number of adjacent value-bearing symbols required to form the triggering event.

13. The gaming system of claim 11, further comprising the operation of presenting, on the presentation assembly, an award based on the values borne by all value-bearing symbols in the array when the number of adjacent value-bearing symbols on the pay line are fewer than the predetermined number of adjacent value-bearing symbols required to form the triggering event.

14. The gaming system of claim 11, wherein at least one value borne by the value-bearing symbols comprises a multiplier.

15. The gaming system of claim 11, wherein at least one value borne by the value-bearing symbols indirectly indicates a jackpot value.

16. The gaming system of claim 11, wherein at least two columns of the array comprise a different number of symbols.

17. The gaming system of claim 16, wherein the array comprises five columns and the first column comprises three symbols, the second column comprises four symbols, the third column comprises five symbols, the fourth column comprises six symbols and the fifth column comprises seven symbols.

18. The gaming system of claim 11, further comprising the operations of:

detecting, via a value input device, a physical item associated with a monetary value that establishes a credit balance; and receiving, via at least one of one or more electronic input devices, a cash out input that initiates a payout from the credit balance.

19. The gaming system of claim 11, further comprising the operation of:

receiving, via at least one of one or more electronic input devices, a wager input that initiates the spin.

20. The gaming system of claim 19, wherein the award payment based on the values borne by all symbols in the set of linked symbols is modified based on an amount of the wager input.

* * * * *